(12) United States Patent
Dan et al.

(10) Patent No.: US 10,489,993 B2
(45) Date of Patent: Nov. 26, 2019

(54) EMULATOR HARDWARE-IN-LOOP ARCHITECTURE AND CONTROL LOGIC FOR VEHICLE STEER-BY-WIRE TEST SYSTEM

(71) Applicant: GM GLOBAL TECHNOLOGY OPERATIONS LLC, Detroit, MI (US)

(72) Inventors: Alexander John Dan, Ann Arbor, MI (US); Jonathan Hirscher, Waterford, MI (US); Scott P. Sherman, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 326 days.

(21) Appl. No.: 15/496,812

(22) Filed: Apr. 25, 2017

(65) Prior Publication Data

US 2018/0308296 A1    Oct. 25, 2018

(51) Int. Cl.
| | |
|---|---|
| G06F 17/50 | (2006.01) |
| G06F 9/445 | (2018.01) |
| G06F 9/455 | (2018.01) |
| G07C 5/08 | (2006.01) |
| B62D 5/04 | (2006.01) |
| B62D 15/02 | (2006.01) |
| G07C 5/00 | (2006.01) |
| G01M 17/06 | (2006.01) |

(52) U.S. Cl.
CPC .............. *G07C 5/08* (2013.01); *B62D 5/04* (2013.01); *B62D 15/021* (2013.01); *G01M 17/06* (2013.01); *G06F 17/5095* (2013.01); *G07C 5/008* (2013.01); *G06F 9/455* (2013.01); *G06F 2217/16* (2013.01)

(58) Field of Classification Search
CPC ......... G06F 9/44; G06F 17/5095; B62D 5/04; G01M 17/5095; B60W 10/06; B60W 50/06
USPC ......................................... 703/2, 5, 7, 22, 24
See application file for complete search history.

(56) References Cited

U.S. PATENT DOCUMENTS

| | | | |
|---|---|---|---|
| 4,282,471 A | * | 8/1981 | Budniak ................... H02P 8/00 318/400.12 |
| 6,370,460 B1 | | 4/2002 | Kaufmann et al. |
| 6,564,131 B2 | | 5/2003 | Sebastian et al. |
| 6,580,988 B2 | | 6/2003 | Lin et al. |

(Continued)

*Primary Examiner* — Thai Q Phan

(74) *Attorney, Agent, or Firm* — Quinn IP Law

(57) ABSTRACT

Disclosed are emulator architectures for steer-by-wire (SBW) vehicle systems, methods for making and for using such systems, and programmable control logic for operating emulator test systems. A method is disclosed for operating an emulator test system for motor vehicle SBW systems. The method includes a Central Processing Unit Workstation Controller (CWC) initiating a selected test procedure for the SBW system, and transmitting, to a Motor Controller (MC) of the test system, a target input curve corresponding to the initiated test procedure. The MC responsively commands a Driver Simulator Motor (DSM) to operate at a power input corresponding to the target input curve. An emulator, which is mechanically coupled to the DSM, transmits emulator state data resulting from operating the DSM to a Real-time Operating System (RTOS). The RTOS determines a vehicle response based on the emulator state data using a vehicle dynamics math model corresponding to the SBW system.

20 Claims, 2 Drawing Sheets

(56) References Cited

U.S. PATENT DOCUMENTS

| | | |
|---|---|---|
| 6,735,507 B2 | 5/2004 | Grougan et al. |
| 10,037,443 B2 * | 7/2018 | Maturana ............... G05B 17/02 |
| 2004/0056614 A1 | 3/2004 | Kobayashi |
| 2005/0082909 A1 | 4/2005 | Constantakis et al. |
| 2005/0217414 A1 | 10/2005 | Gibson |
| 2012/0265417 A1 * | 10/2012 | Vollert ................. B60T 13/745 |
| | | 701/70 |
| 2014/0145498 A1 * | 5/2014 | Yamakado ............ B60T 8/1755 |
| | | 303/3 |
| 2015/0019191 A1 * | 1/2015 | Maturana ............... G05B 17/02 |
| | | 703/13 |
| 2015/0104757 A1 * | 4/2015 | Moncrief ............... G09B 9/302 |
| | | 434/38 |
| 2015/0112525 A1 * | 4/2015 | Johri .................... B60W 10/06 |
| | | 701/22 |

\* cited by examiner

EMULATOR HARDWARE-IN-LOOP ARCHITECTURE AND CONTROL LOGIC FOR VEHICLE STEER-BY-WIRE TEST SYSTEM

INTRODUCTION

The present disclosure relates generally to drive-by-wire (DBW) systems for motor vehicles. More specifically, aspects of this disclosure relate to emulator hardware-in-loop (HIL) test benches and attendant control algorithms for testing or calibrating vehicle steer-by-wire (SBW) systems.

Current production motor vehicles, such as the modern-day automobile, are originally equipped with a steering system that allows the driver to maintain a desired course for the vehicle and to control directional changes of the vehicle. Many conventional steering systems utilize a hand-operated steering wheel that is manipulated by the driver to input a desired direction of travel for the vehicle. The steering wheel is mounted via a central hub to a collapsible or non-collapsible steering column assembly. Telescoped shafts of a collapsible steering column, for example, interconnect the steering wheel with the vehicle's road wheel steering mechanism, the most common of which is the rack-and-pinion steering architecture. In this architecture, a pinion gear at the distal end of a steering shaft is intermeshed with a linear gear bar, known as a "rack." When the steering wheel is rotated, the pinion gear spins with the rotating steering shaft, causing the rack to move rectilinearly along a transverse plane of the vehicle. A tie rod at each end of the rack is connected to the steering arm of a wheel's spindle; the moving rack and tie rod pivot the spindle to thereby turn the road wheel. Driver input may be augmented with electric, hydraulic or pneumatic Power Assisted Steering (also referred to as "PAS" or, more commonly, as "power steering") to introduce supplemental energy to the steering mechanism and thereby reduce driver effort.

Some contemporary steering system designs eliminate any direct mechanical linkages that drivingly couple the steering wheel to the road wheels, such as the steering column and flexible gear-to-column coupling, and replace these linkages with electro-mechanical components and a human-machine interface (HIM) in what has become known as a "steer-by-wire" system. One such steer-by-wire system employs a position encoder, rotational transducer, or other steering wheel sensor that monitors the position, displacement, and/or turning rate of the steering wheel. The position encoder translates these inputs into corresponding position, rate, and displacement values for turning of the vehicle's road wheels. A drivetrain control module or dedicated steering controller then outputs command signals to an electric motor that swivels the vehicle road wheels in response to the command signals. To convey a sense of "road feel" to the driver, the steer-by-wire system may incorporate tactile transducers, linear actuators, resistive brakes, and/or stepper motors which, controlled by the electronic steering controller, effects controllable feedback during operation of the vehicle.

The operational commands sent by the steering controller to the electric steering motor and road-feel devices may be adapted to the operating conditions of the vehicle, such as for inclement weather conditions, poor road conditions, or less-than-optimal steering system conditions. For instance, an in-vehicle electronic control unit may reference a calibration table that relates various operating conditions of the vehicle to desired assistive torque values for the steer-by-wire system. This calibration table, which may be stored locally by a resident memory device, is typically produced through vehicle system testing and benchmark simulation testing to provide a desirable amount of assistive torque for each of the various operating conditions. Defining the system-calibrated values for the operational commands in the calibration table may be referred to as "tuning" the calibration table, and is typically performed during vehicle development. In the past, tuning calibration tables for vehicle steer-by-wire systems required installing all electronic and electro-mechanical steering hardware and related control logic on a prototype vehicle, test driving the prototype vehicle with a preliminary calibration table, and then adjusting the calibration table based on the subjective feel observed by a test driver of the prototype vehicle.

SUMMARY

Disclosed herein are hardware-in-loop (HIL) emulator architectures for (SBW) steer-by-wire systems, methods for making and methods for using such emulator architectures, and programmable control logic for operating a HIL emulator system for calibrating a vehicle SBW steering system. By way of example, and not limitation, there is presented a novel SBW column emulator HIL test bench that uses a hardware in the loop simulator, vehicle dynamics model data, and a driver simulator machine to test and tune SBW systems without test vehicles or other vehicle components. The HIL emulator architecture includes a Central Processing Unit (CPU) with a CPU Workstation Controller (CWC) for selecting and initiating a test sequence. The CWC sends commands to a programmable Motor Controller (MC) and, based on feedback from the MC, runs a control loop. The MC sends power to an electro-mechanical Driver Simulator Motor (DSM) that, in turn, provides the MC with motor state data. The DSM may be physically attached to an input shaft of the emulator via rotational couplers. External bench sensors are operable to provide bench state data to the CWC. The emulator communicates with a Real-time Operating System (RTOS), transmitting steering wheel angle and steering wheel torque data. The RTOS may be embodied as a computer-executed system software application that processes data in real-time, e.g., without buffering delays. A vehicle model within the RTOS computes vehicle response, and transmits steering rack position, steering rack force, and other related data to the emulator, which reacts to those signals. Using the HIL simulator in conjunction with a vehicle model, relevant signals may be communicated to the SBW emulator to perform vehicle level tests at the driver simulator bench level. The SBW emulator communicates with the HIL simulator to measure and tune vehicle dynamics in a real time, closed loop environment.

Attendant benefits for at least some of the disclosed concepts include a HIL emulator test bench that is fully operational in a lab setting yet may be implemented and controlled as if it were installed in a test vehicle. In so doing, the SBW emulator helps to reduce program costs by performing tuning and platform case testing without using development test vehicles. By eliminating the need for test vehicles during SBW calibration, tuning and testing will not be delayed by inclement weather or poor road conditions since testing may be performed in a lab setting. In a similar regard, fault insertions may be performed without driver risk or risk to expensive test equipment. Disclosed emulator architectures also allow for the testing of as-delivered emulator hardware, and emulator-specific debugging may be performed without a rack actuator or other dedicated hardware. Subjective influence of individual test drivers and engineers is minimized because SBW calibrations are metric-based values providing for consistency between tuning engineers.

Aspects of the present disclosure are directed to control algorithms for regulating operation of a SBW column emulator HIL test system. Disclosed, for example, is a method for operating an emulator test system for an SBW system of a motor vehicle. The method includes, in any order and in any combination with any of the disclosed features: initiating, via a CPU Workstation Controller of the emulator test system, a test procedure for the SBW system (e.g., selected by a user at the workstation); the CWC transmitting, to a Motor Controller of the emulator test system, a target input curve (e.g., target timewise position and/or timewise torque trajectory) corresponding to the initiated test procedure; the MC responsively commanding a Driver Simulator Motor to operate at a desired power input based on the target input curve; transmitting, to a Real-time Operating System via an emulator mechanically coupled to the DSM, emulator state data resulting from the DSM operating at the desired power input command, and according to vehicle response data resulting from the RTOS; and, the RTOS responsively determines a vehicle response based on the emulator state data using a vehicle dynamics math model corresponding to the SBW system. This method may further comprise executing a closed-loop servomotor control loop to determine a new instantaneous power level based on the prior target input curve and feedback data from the MC. A command signal is then sent to the DSM to operate at the new power level. As another option, the CWC may compare the emulator state and vehicle response data with corresponding target vehicle values from the RTOS to determine a new target command curve for the SBW system. The method may also measure one or more metrics related to steering emulator performance, and compare these measured performance metrics to objective metrics.

Other aspects of the present disclosure are directed to SBW column emulator HIL architectures for testing and calibrating SBW systems of motor vehicles. A "motor vehicle," as used herein, may include any relevant vehicle platform, such as passenger vehicles (internal combustion engine (ICE), hybrid, full electric, fuel cell, fully or partially autonomous, etc.), commercial vehicles, industrial vehicles, tracked vehicles, off-road and all-terrain vehicles (ATV), farm equipment, boats, airplanes, etc. As an example, an emulator test system for calibrating a vehicle SBW system is disclosed. The emulator test system includes a computer workstation with a CPU Workstation Controller that is programmed to receive a selected test procedure, e.g., from a user, and responsively initiate the selected test procedure, which includes outputting a target input curve corresponding to the initiated test procedure. A Motor Controller, which is communicatively connected to the CWC, is programmed to process the target input curve output by the CWC and determine therefrom a power input command. The emulator test system also includes a Driver Simulator Motor that communicates with the MC to receive therefrom the power input command and responsively generate a rotational output via a DSM output shaft. An emulator, which includes an emulator input shaft mechanically coupled to the DSM output shaft, generates emulator state data resulting from the DSM operating according to MC's power input command, and according to vehicle response data resulting from the RTOS. The emulator test system also includes a Real-time Operating System that is programmed to receive emulator state data from the emulator and to determine, via a vehicle dynamics math model corresponding to the SBW system, a vehicle response based on the emulator state data.

Additional aspects of the present disclosure are directed to non-transitory, computer readable media storing instructions executable by at least one of one or more processors of one or more networked electronic controllers. These instructions, when executed, cause the controller(s) to perform various operations, which may include, in any order and in any combination with any features presented in this disclosure: initiating a test procedure for the SBW system; identifying a target input curve corresponding to the initiated test procedure; commanding a DSM to operate at a target power input based on the target input curve; receiving, via an RTOS from an emulator mechanically coupled to the DSM, emulator state data resulting from the DSM operating at the target power input; and, determining, via the RTOS with a vehicle dynamics math model corresponding to the SBW system, a vehicle response based on the emulator state data.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
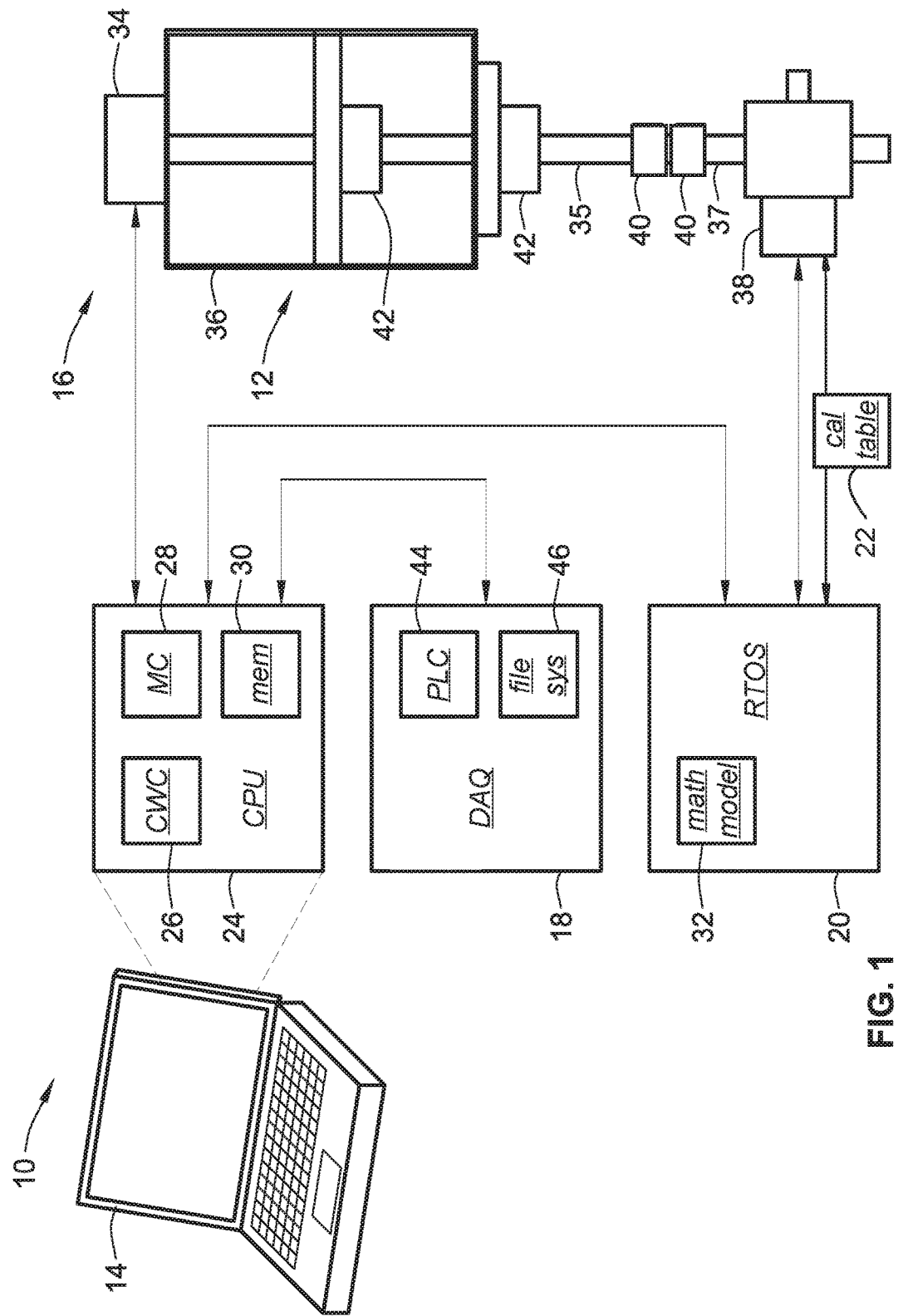
FIG. 1 is a schematic diagram of a representative hardware-in-loop (HIL) emulator testing and tuning system for vehicle steer-by-wire systems in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a diagram of a representative steer-by-wire (SBW) column emulator hardware-in-loop (HIL) test architecture, which is designated generally at 10 and identified hereinafter as "emulator test system" for ease of reference. The emulator test system 10 is described herein as being implemented to test an SBW steering system 12 of a passenger-style automobile and tune one or more calibration tables 22 for the steering system 12. It should be appreciated, however, that an automobile steering system is merely an exemplary application with which the novel aspects and features of this disclosure may be practiced. In the same vein, implementation of the present concepts for tuning calibration tables of an SBW system should be appreciated as an exemplary application of the aspects and features disclosed herein. As such, it will be understood that the concepts of the present disclosure may be applied for analyzing any aspect of an SBW system, and may be implemented for any logically relevant type of motor vehicle. Lastly, select components of the system 10 have been shown and will be described in further detail below; nevertheless, the disclosed system architectures may include numerous additional and alternative features, and other well-known peripheral components, for example, for carrying out the various functions and methodologies disclosed herein.

For the representative architecture and application illustrated in FIG. 1, each calibration table 22 relates one or more vehicle operating conditions to one or more calibrated steering settings. This calibrated steering setting may include, for example, a drive wheel angle and/or drive wheel torque that is applied by an electronically controlled steering mechanism (e.g., an electric steering motor) of a SBW power steering system to a component of the steering system (e.g., a gear rack via an attached pinion gear) to assist with turning one or more road wheels of the vehicle. Thus, the size of the drive wheel angle or the magnitude of the drive wheel torque applied by the electric motor varies, and depend upon current operating conditions of the vehicle, such as weather conditions, road conditions, system operating conditions, etc. The values of the steering setting for the different possible operating conditions of the vehicle are defined by and stored in the calibration table 22. During system development, each calibration table 22 is "tuned" i.e., adjusted or modified, to develop what are designated as "optimum" steering setting values for the different operating conditions of the vehicle. Typically, a calibration table 22 is specific to an individual vehicle model and/or an individual steering system configuration; as such, each new vehicle design and/or steering system configuration that uses SBW steering may require a calibration table or set of tables 22 that are tuned for that specific vehicle design and/or system configuration.

Emulator test system 10 of FIG. 1 includes a computer-based user workstation 14 that communicates with a SBW test bench 16, a data acquisition (DAQ) storage unit 18, and a Real-time Operating System (RTOS) 20. In FIG. 1, the two-headed arrows interconnecting the workstation 14 with other system components are emblematic of electronic signals or other communication exchanges by which data and/or control commands are transmitted from one system component to the other. Workstation 14 is exemplified in FIG. 1 as a high-performance computing (HPC) laptop computer; nevertheless, the user workstation 14 may take on many forms, such as a high-performance dedicated workstation stand, a desktop computer, or other computing device. Optimized with increased processing, memory, and multitasking capabilities for manipulation of complex data, mechanical design, and engineering simulation, the user workstation 14 is equipped with, among other main and peripheral hardware components, a central processing unit (CPU) 24 composed of a CPU Workstation Controller (CWC) 26, a motor controller (MC) 28, and a resident memory 30. Stored locally on the resident memory 30 of the workstation's CPU 24 or on a resident memory of the computing device running the RTOS 20 is a vehicle dynamics math model 32 corresponding to the SBW system 12. Vehicle dynamics math model 32 may be embodied as a commercial software package, such as CARSIM™ to predict vehicle performance in response to a driver control input (e.g., steering rate, displacement, etc.) in a given environment (e.g., road geometry, coefficients of friction, rain, wind, etc.).

Controller, control unit, control module, module, processor, and similar terms may be used interchangeably herein, for example, to mean any one or various combinations of one or more of Application Specific Integrated Circuit(s) (ASIC), electronic circuit(s), central processing unit(s), microprocessor(s), module(s) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be used herein to mean any controller-executable instruction sets, including calibration values and look-up tables. A controller or control unit may be designed with a set of control routines executed to provide the desired functions. Control routines are executed, such as by a central processing unit, and are operable to monitor inputs from sensing devices and other networked control modules, and execute control and diagnostic routines to control, for example, operation of devices and actuators. Routines may be executed at regular intervals, for example, every 100 microseconds, 3.125, 6.25, 12.5, 25 and/or 100 milliseconds during ongoing vehicle testing or operation. Alternatively, routines may be executed in response to occurrence of an event.

With continuing reference to FIG. 1, SBW simulation test bench 16 is equipped with a driver simulator motor (DSM) 34 for simulating user operation of a vehicle steering wheel, and a motor support base 36 to which is physically mounted the motor 34. While various alternative forms are envisioned, the DSM 34 of FIG. 1 may be an electric servomotor that is controlled by MC 28 to angularly displace a position encoder, rotational transducer, or other steering wheel output structure. As shown, for example, an output shaft 35 of DSM 34 is physically attached, e.g., via rotational couplers 40, to an input shaft 37 of an SBW emulator 38. The DSM 34 and SBW emulator 38 may be generally representative of an automobile SBW steering system 12. According to the illustrated example, the SBW emulator 38 is a "steering feel" type emulator that is operable to physically replicate vehicle response, e.g., to driver inputs, steering system reactions, and operating conditions of the vehicle, and provide such response as road feel feedback to the DSM 34. In so doing, SBW emulator 38 may control the responsiveness of the DSM 34 to road conditions and to the forces provided to the steering wheel. As a secondary option, instead of utilizing the illustrated DSM 34, bench control can be operated by human input, e.g., via a steering wheel.

One or more external bench sensors or transducers 42 are fixed, e.g., via mounting brackets, at various locations within the test bench 16 architecture. According to the representative architecture of FIG. 1, sensors 42 are placed in-between and in-line with the DSM 34 and SBW emulator 38. Measurement devices and/or hardware modifications of varying configurations may be mounted at alternative sites to generate different information (e.g., mounting a torsion spring and inertial mass). Each sensor/transducer 42 may take on any of various commercially available and hereafter developed forms (e.g., torque sensor, steering angle sensor, force transducer, etc.) depending, for example, on the intended use of the SBW test bench 16.

DAQ storage unit 18 of FIG. 1 is shown as an auxiliary data storage device operable for retrieving signals from sensing and measurement sources, processing these signals for analysis, storage of the data, and presentation, e.g., via user workstation 14 or a dedicated DAQ display device (not shown). The illustrated DAQ storage unit 18 may come in many different computing technology formats, which may be chosen from Peripheral Component Interconnect (PCI), PCI eXtensions for Instrumentation (PXI), PCI Express, PXI Express, Personal Computer Memory Card International Association (PCMCIA), Universal Serial Bus (USB), wireless, and Ethernet data acquisition for test, measurement, and automation applications, as some non-limiting examples. The DAQ 18 may include one or more programmable logic controllers (PLC) 44 contained in a control appliance, and a database formatted storage file system 46 for storing data acquired during operation of the emulator test system 10.

The RTOS 20 is illustrated in FIG. 1 as an independently running computer operating system (OS) operable to process data in real-time, e.g., without attendant buffering or OS delays, and facilitate time-critical tasks being performed by the system 10 according to predetermined execution frequencies and execution priorities. Communication between the workstation 14, DAQ 18, and RTOS 20 may take place through any logically relevant media, such as telephone lines (e.g., Dial-Up), local area network (LAN) or wide area network (WAN) links (e.g., Ethernet, T(X) lines, X.25, etc.), broadband connections (e.g., Integrated Service Data Network (ISDN), Frame Relay, etc.), wireless links (e.g., infrared, Bluetooth®, WiFi or WLAN), cellular networks, and so on. Alternatively, the system 10 may eliminate the distributed architecture of the illustrated components, and combine the workstation 14, DAQ 18, and/or RTOS 20 into a single computing device or other permutation thereof.

The SBW emulator test system 10 of FIG. 1 helps to eliminate the need for retrofitted test vehicles and other vehicle test components to analyze or otherwise develop the SBW steering system 12, which in turn helps to reduce program costs. This will allow tuning calibration and vehicle case evaluation for SBW systems in a real-time, closed-loop testing environment. The illustrated SBW test bench 16 and RTOS 20 architecture allows for the SBW emulator 38 to be controlled as if it were in an actual vehicle. Using a HIL simulator in conjunction with a vehicle dynamics math model allows relevant signals to be communicated to the SBW emulator 38 to perform vehicle level tests in a bench level setting. This helps to eliminate testing and tuning delays associated with weather and road conditions since all testing/tuning may be performed in a lab.

Figure 2:
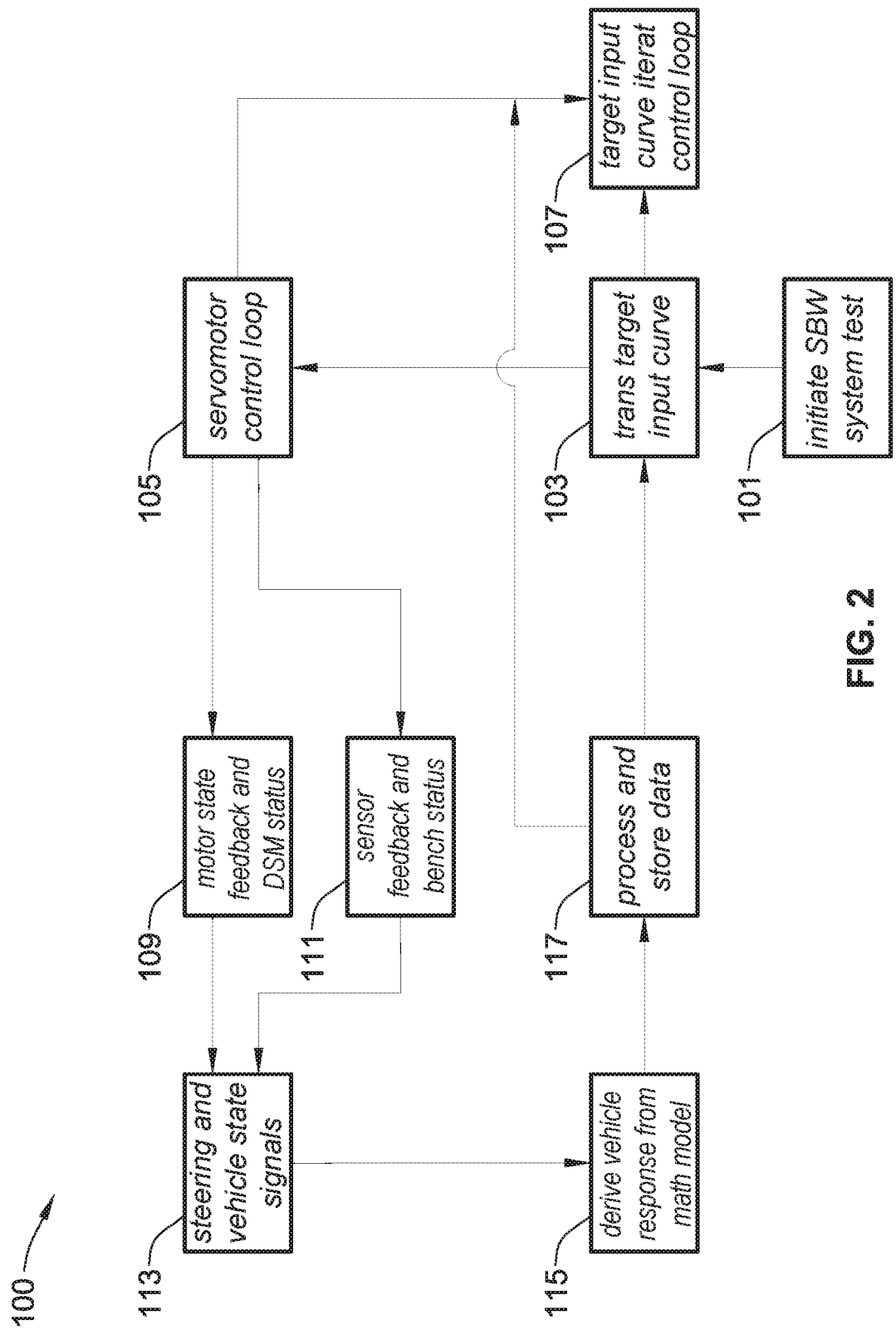
FIG. 2 is a flowchart for a representative HIL emulator control algorithm that may correspond to memory-stored instructions executed by control-logic circuitry, programmable electronic controller, or other computer-based device in accord with aspects of the disclosed concepts.

With reference now to the flow chart of FIG. 2, an improved method or control strategy for operating an emulator test system, such as SBW column emulator HIL test architecture 10 of FIG. 1, designed for testing and/or calibrating a steer-by-wire system, such as vehicle SBW system 12 in FIG. 1, for example, is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an ECU, a central processing unit (CPU), a resident or remote control logic circuit, or other device or combination of devices, to perform any or all of the above and/or below described functions associated with the disclosed concepts.

Method 100 of FIG. 2 starts at terminal block 101 with initiating a test procedure for the SBW system, e.g., via the CWC 26 of FIG. 1. By way of non-limiting example, an operator may employ a user input device, such as a keyboard, touchscreen, mouse, trackpad, and the like, to select a desired system test on user workstation 14 and, once selected, initiate a run of the selected test. Alternatively, selection of a test procedure for execution by the emulator test system 10 may be automated by a local or remote device. CWC 26 of workstation 14 may be programmed, according to process block 103 of FIG. 2, to then transmit a target input curve corresponding to the initiated test procedure to a motor controller of the emulator test system, such as MC 28 of FIG. 1. Optionally, or alternatively, the target input curve is transmitted to the MC by a peripheral operating system (OS), such as RTOS 20 of FIG. 1, running on a networked computing device. This target input curve may include, singly and in any combination, a target timewise position command signal and/or a target timewise torque command signal for regulating operation of a driver-simulating device, such as DSM 34 of FIG. 1 (e.g., turn 90 degrees at 110 deg/s, defined as position vs. time or torque vs. time). In at least some applications, a target input curve may be in the form of a sine wave with a ramping amplitude. To start a first iteration of a subroutine in the test procedure, an initial or "first" target input curve may be a computer-generated default curve, a human selected "best-guess" based on previous tests, or may originate from a comparable SBW platform.

With continuing reference to FIG. 2, the method 100 may proceed to execute either process block 105 or process block 107, or contemporaneously execute both, to begin operation of the closed-loop servomotor control loop for the DSM (block 105) and/or to implement a closed-loop target input curve iteration control loop (block 107). As per the former, and with reference to the representative architecture of FIG. 1, the MC 28 or another networked controller transmits a control command to the DSM 34 or other driver-simulating device to operate at a power input based, at least in part, on the target input curve. For instance, block 105 may comprise processor-executable instructions for the MC 28 to command the DSM 34 to apply a corresponding steering torque and/or a corresponding steering position to the SBW emulator 38 via shafts 35, 37. A HIL simulator may be implemented to vary the rotational output of the MC 28 to better imitate the types of inputs expected from a driver of a vehicle. During output of the driver-simulated steering torque and position, the DSM 34 may responsively provide motor state feedback, at block 109, to the MC 28 for use with the closed-loop servomotor control loop at block 105.

Given a target input curve and motor response feedback from the MC 28, DSM 34 and/or external sensors 42 (see discussion below on test bench feedback with respect to process blocks 109 and 111), processor-executable control logic of process block 105 includes a closed-loop servomotor control loop that is run, for example, to help ensure correct motor performance during operation of the emulator test system 10. For instance, the control loop may be utilized to determine a new motor power level based on an initial/default/prior target input curve, feedback data from the MC 28, and bench data from the sensors. This new target power level may then be saved to a local memory device, such as CPU resident memory 30, or a remote memory storage device, such as DAQ storage unit 18. Once identified, the newly determined input is utilized by the MC 28 to operate the DSM 34 at a new instantaneous power level. For at least some configurations, the MC 28 may provide feedback to the CWC 26, and the CWC 26 will run the servomotor control loop logic. Alternatively, the MC 28 may provide feedback to the RTOS 20, and the RTOS 20 will run the servomotor control loop logic; optionally, the MC 28 may internally run the servomotor control loop logic.

Emulator test system control strategy 100 includes, at process blocks 109 and 111, acquiring bench feedback on the operating status of the DSM 34 (block 109) and gathering sensor feedback on the operating status of the emulator 38, DSM 34, input and output shafts 37, 35, and/or other bench status data (block 111). For the representative emulator test system 10 of FIG. 1, external bench torque/position sensors 42 generate feedback data for the motor control loop. Some possible system layouts include, for example, communicatively connecting one or more of the test bench sensors 42 to the MC 28, communicatively connecting the test bench sensor(s) 42 to the CWC 26, communicatively connecting one or more of the test bench sensors to the RTOS 20, and/or communicatively connecting one or more test bench sensors directly to the DAQ 18. During operation of the emulator test system 10, the external bench sensor/transducer(s) 42 of FIG. 1 generate bench state data sensor signals indicative of one or more characteristics of the DSM 34, SBW emulator 38, shafts 35, 37, etc., and output these signals to the workstation 14, DAQ 18, and/or RTOS 20. This bench state data may be used to operate the closed-loop servomotor control loop. In the same vein, motor state data received via the MC 28 from the DSM 34, which is indicative of one or more operating characteristics of the DSM 34, may be used to calculate a new target input curve with the closed-loop servomotor control loop.

The method 100 of FIG. 2 continues to process block 113, where the SBW emulator 38 communicates with the RTOS 20, transmitting steering wheel angle, steering wheel torque, and/or other vehicle-state signals. Process block 115 includes processor-executable instructions for the RTOS 20 to determine a vehicle response based on the emulator state data using a vehicle dynamics math model corresponding to the SBW system. The vehicle response may include, among other system feedback values, a calculated steering rack position value and/or a calculated steering rack force value. To determine a vehicle response may require compiling the vehicle dynamics math model, loading the compiled vehicle dynamics math model into simulator processor boards of the RTOS, and communicating with a vehicle dynamics simulation software platform to simulate a mathematical equivalent of a simulated vehicle driving with the SBW system. For instance, vehicle model 32 may be compiled within a content management software application of the RTOS 20, such as a dSPACE™ repository software package, and operable to compute a predicted vehicle response, such as the rectilinear steering rack movement and attendant reactionary forces. For at least some applications, this vehicle simulation package is designed to run real-time, full-vehicle dynamic models, given specific inputs, calculate the response of each modeled vehicle component, and simulate Controller Area Network (CAN) messages for the physical test specimen. RTOS 20 then transmits the predicted vehicle response to the SBW emulator 38, which then reacts to those signals and other vehicle-state signals.

In a more specific, non-limiting example, the DSM 34 is controlled by MC 28 to steer the SBW emulator 38 approximately 30 degrees counterclockwise in FIG. 1 at a rate of approximately 400 deg/sec. The SBW emulator 38 responsively generates and transmits position, torque, and other emulator state signals from internal sensors, e.g., over a CAN module or buses, to the RTOS 20. The RTOS 20 receives these emulator state signals, and inputs this 30-degree turn into the vehicle model 32 running inside RTOS 20. The vehicle math model 32 processes the data and calculates a predicted response, which may include all interactions between the various components of the vehicle's steering system, road loads, chassis response, etc., as defined by the vehicle model. The RTOS 20 then sends vehicle response information (e.g., force and position at the steering rack) to the SBW emulator 38, which then reacts to those signals and generates for the driver a simulated resistive force.

At process block 117, the accumulated bench, emulator, vehicle model, and control loop data is transmitted to the CWC 14 and/or the DAQ 18 for processing, management and storage. Some representative communication layouts include the RTOS 20 outputting vehicle response data to CWC 14, and the CWC 14 then iterating the data to compute an improved target command curve accordingly. Alternatively, the RTOS 20 may internally iterate the data to compute an improved target command curve accordingly. A new "improved" target command curve is then either passed to the CWC 14 or the RTOS 20, e.g., depending on which component provides the new target curve to the MC 28. For instance, the RTOS 20 may transmit to the CWC 14 emulator state data and calculated vehicle response data; the CWC then compares the emulator state data and vehicle response data with corresponding target vehicle values to determine a new target command curve for the SBW system. Alternatively, the RTOS 20 compares the emulator state data and vehicle response with corresponding target vehicle values to determine a new target command curve for the SBW system. Data acquisition (DAQ) storage unit 18 may store all target input curves, emulator state data, and vehicle response data.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A method for operating an emulator test system for a steer-by-wire (SBW) system of a motor vehicle, the method comprising:
    initiating, via a Central Processing Unit (CPU) with a CPU Workstation Controller (CWC) of the emulator test system, a test procedure for the SBW system;
    transmitting, via the CWC to a Motor Controller (MC) of the emulator test system, a target input curve corresponding to the initiated test procedure;
    commanding, via the MC, a Driver Simulator Motor (DSM) of the emulator test system to operate at a power input based on the target input curve, the DSM including an electric motor operable to simulate user operation of a steering wheel of the motor vehicle;
    transmitting, to a Real-time Operating System (RTOS) via an emulator mechanically coupled to the DSM, emulator state data resulting from the DSM operating at the power input, the emulator being operable to physically replicate reaction of the motor vehicle to a steering input generated by the DSM when operating at the power input; and
    determining, via the RTOS with a vehicle dynamics math model corresponding to the SBW system, a vehicle response based on the emulator state data.

2. The method of claim 1, further comprising:
    transmitting, to the emulator via the RTOS, determined vehicle response data indicative of the vehicle response;
    determining, via the emulator based on the vehicle response data using stored calibration tables, a mechanical feedback emulating the vehicle response; and
    transmitting, via the emulator to the DSM, the mechanical feedback emulating the vehicle response.

3. The method of claim 1, wherein transmitting the target input curve includes the CWC and/or the RTOS transmitting to the MC a target timewise position command signal and/or a target timewise torque command signal of the steering wheel of the motor vehicle.

4. The method of claim 1, further comprising:
    executing a closed-loop servomotor control loop to determine a new instantaneous power level based on the target input curve and feedback data determined by the MC; and
    commanding the DSM to operate at the new instantaneous power level.

5. The method of claim 1, further comprising:
    receiving, from a bench sensor operatively coupled to the DSM, bench state data indicative of one or more characteristics of the DSM while operating at the power input; and
    executing a closed-loop control loop to determine a new target input curve that is based on bench state data.

6. The method of claim 5, further comprising receiving, via the MC from the DSM, motor state data indicative of one or more characteristics of the DSM while operating at the power input, wherein determining the new target input curve with the closed-loop servomotor control loop is further based on bench motor state data.

7. The method of claim 1, further comprising:
    transmitting, via the RTOS to the CWC, the emulator state data and the vehicle response; and
    comparing, via the CWC, the emulator state data and the vehicle response with corresponding target vehicle values to determine a target command curve for the SBW system.

8. The method of claim 1, further comprising comparing, via the RTOS, the emulator state data and vehicle response with corresponding target vehicle values to determine a target command curve for the SBW system.

9. The method of claim 1, wherein determining the vehicle response includes compiling the vehicle dynamics math model, loading the compiled vehicle dynamics math model into simulator processor boards of the RTOS, and communicating with a vehicle dynamics simulation software platform to simulate a mathematical equivalent of a simulated vehicle driving with the SBW system.

10. The method of claim 1, wherein commanding the DSM to operate at the power input causes the DSM to output a corresponding steering torque and/or a corresponding steering position to the emulator.

11. The method of claim 1, further comprising storing, via a data acquisition (DAQ) storage unit communicatively connected to the CWC, RTOS, and emulator, the target input curve, the emulator state data and the vehicle response.

12. The method of claim 1, wherein the emulator state data includes steering wheel angle signals and/or steering wheel torque signals.

13. The method of claim 1, wherein the DSM is physically attached to an emulator input shaft of the emulator via one or more rotational couplers, and wherein commanding the DSM to operate at the power input causes the DSM to rotate the emulator input shaft.

14. An emulator test system for calibrating a vehicle steer-by-wire (SBW) system of a motor vehicle, the emulator test system comprising:
a computer workstation with a CPU Workstation Controller (CWC) programmed to receive a selected test procedure form a user and responsively initiate the selected test procedure, initiating the selected test procedure including outputting a target input curve corresponding to the initiated test procedure;
a Motor Controller (MC) communicatively connected to the CWC and programmed to process the target input curve output by the CWC and determine therefrom a power input command;
a Driver Simulator Motor (DSM) communicatively connected to the MC and configured to receive from the MC the power input command and responsively generate a rotational output via a DSM output shaft, the rotational output of the DSM simulating user operation of a steering wheel of the motor vehicle;
an emulator with an emulator input shaft mechanically coupled to the DSM output shaft, the emulator being configured to generate emulator state data resulting from the DSM operating according to the power input command, the emulator being operable to replicate reaction of the motor vehicle to the rotational output of the DSM; and
a Real-time Operating System (RTOS) communicatively connected to the emulator and the CWC, the RTOS being programmed to receive from the emulator the emulator state data and to determine, via a vehicle dynamics math model corresponding to the SBW system, a vehicle response based on the emulator state data.

15. A non-transitory, computer readable medium storing instructions executable by one or more controllers of an emulator test system for testing and calibrating a steer-by-wire (SBW) system of a motor vehicle, the instructions causing at least one of the one or more controllers to perform operations comprising:
initiating a test procedure for the SBW system;
identifying a target input curve corresponding to the initiated test procedure;
commanding a Driver Simulator Motor (DSM) to operate at a power input based on the target input curve, the DSM including an electric motor operable to simulate user operation of a steering wheel of the motor vehicle;
receiving, via a Real-time Operating System (RTOS) from an emulator mechanically coupled to the DSM, emulator state data resulting from the DSM operating at the power input, the emulator being operable to physically replicate reaction of the motor vehicle to a steering input generated by the DSM when operating at the power input; and
determining, via the RTOS with a vehicle dynamics math model corresponding to the SBW system, a vehicle response based on the emulator state data.

16. The non-transitory, computer readable medium of claim 15, wherein the target input curve includes a target timewise position command signal and/or a target timewise torque command signal of the steering wheel of the motor vehicle.

17. The non-transitory, computer readable medium of claim 15, further comprising instructions causing at least one of the one or more controllers to perform operations comprising:
executing a closed-loop servomotor control loop to determine a new instantaneous power level based on the target input curve and feedback data determined by a Motor Controller (MC); and
commanding the DSM to operate at the new instantaneous power level.

18. The non-transitory, computer readable medium of claim 15, further comprising instructions causing at least one of the one or more controllers to receive, from a bench sensor operatively coupled to the DSM, bench state data indicative of one or more characteristics of the DSM while operating at the power input, and determining a new target input curve with a closed-loop control loop based on bench state data.

19. The non-transitory, computer readable medium of claim 17, further comprising instructions causing at least one of the one or more controllers to receive, from the DSM, motor state data indicative of one or more characteristics of the DSM while operating at the power input, wherein determining the new target input curve with the closed-loop servomotor control loop is further based on motor state data.

20. The non-transitory, computer readable medium of claim 15, further comprising instructions causing at least one of the one or more controllers to compare, via the RTOS, the emulator state data and vehicle response with corresponding target vehicle values to determine a target command curve for the SBW system.

* * * * *